(12) United States Patent
Drobe et al.

(10) Patent No.: US 8,333,471 B2
(45) Date of Patent: Dec. 18, 2012

(54) SERIES OF PROGRESSIVE OPHTHALMIC LENSES

(75) Inventors: Bjorn Drobe, Charenton le Pont (FR);
Claude Pedrono, Charenton le Pont (FR)

(73) Assignee: Essilor International (compagnie Generale d'Optique), Charenton le Pont (FR)

( * ) Notice: Subject to any disclaimer, the term of this patent is extended or adjusted under 35 U.S.C. 154(b) by 102 days.

(21) Appl. No.: 12/920,553

(22) PCT Filed: Mar. 2, 2009

(86) PCT No.: PCT/FR2009/050335
§ 371 (c)(1),
(2), (4) Date: Apr. 7, 2011

(87) PCT Pub. No.: WO2009/115718
PCT Pub. Date: Sep. 24, 2009

(65) Prior Publication Data
US 2011/0176102 A1    Jul. 21, 2011

(30) Foreign Application Priority Data

Mar. 11, 2008  (FR) ..................................... 08 51582

(51) Int. Cl.
*G02C 7/06*  (2006.01)
(52) U.S. Cl. .............................. 351/159.42; 351/159.75
(58) Field of Classification Search ............. 351/159.01, 351/159.41–159.49, 159.75, 159.76, 159.8
See application file for complete search history.

(56) References Cited

U.S. PATENT DOCUMENTS

| 5,270,745 | A  | 12/1993 | Pedrono |
| 5,272,495 | A  | 12/1993 | Pedrono |
| 5,949,519 | A  | 9/1999  | Le Saux et al. |
| 2009/0290121 | A1 | 11/2009 | Drobe et al. |
| 2010/0110373 | A1 | 5/2010  | Drobe et al. |

FOREIGN PATENT DOCUMENTS

| AU | 741951      | 12/2001 |
| EP | 0911670     | 4/1999  |
| EP | 0911673     | 4/1999  |
| JP | 54085743    | 7/1979  |
| WO | 97/38343    | 10/1997 |
| WO | 00/73846    | 12/2000 |
| WO | 2007/068819 | 6/2007  |

OTHER PUBLICATIONS

Schuldt, Stefanie. "Ysis—Natürliches sehen srleben" *Deutsche Optiker Zeitung*, no. May 2004. pp. 38-43. (May 1, 2004).

*Primary Examiner* — Darryl J Collins
(74) *Attorney, Agent, or Firm* — Occhiuti Rohlicek & Tsao LLP

(57) ABSTRACT

A series of progressive ophthalmic lenses is proposed, which is indexed by optical power addition values of eyeglasses of spectacles to be made from these lenses. Each lens of the series determines a further gap between a value of the optical power for the near vision direction and a maximum value of the optical power which is obtained for a direction of gaze pointing below said near vision direction. The lenses of the series are adapted for postures of wearers that may vary as a function of the optical power addition values.

11 Claims, 4 Drawing Sheets

SERIES OF PROGRESSIVE OPHTHALMIC LENSES

CROSS-REFERENCE TO RELATED APPLICATIONS

This application is the National Stage of International Application No. PCT/FR2009/050335, filed on Mar. 2, 2009, which claims the priority of French Application No. 0851582 filed on Mar. 11, 2008, the contents of which are incorporated herein by reference in their entirety.

The present invention relates to a series of progressive ophthalmic lenses, as well as a method for producing a progressive spectacle eyeglass which is intended for an identified wearer, from a lens of such a series.

Progressive spectacle eyeglasses have been used for a long time for correcting an ophthalmic defect of a presbyopic wearer, in a manner which is adapted for viewing both a distant object and a near object. To this end, the eyeglass has optical power values which vary between different points of the latter. Thus, two separate vision zones are provided within the eyeglass: a first zone which is dedicated to far vision, and which is situated in an upper part of the eyeglass, and a second zone which is dedicated to near vision, and which is situated below the far vision zone in a lower part of the eyeglass. The two zones are separated by an intermediate zone in which the optical power varies continuously. In this way, the wearer is not inconvenienced by any optical discontinuity of the eyeglass between the far vision zone and the near vision zone. By eyeglass addition is meant the difference between the optical power values which are produced respectively in the near vision zone and in the far vision zone.

Moreover, it is known to produce a progressive ophthalmic eyeglass from a semi-finished lens, one of the two faces of which is produced directly in its final form. Usually, the final face of the semi-finished lens is the front face, with respect to the position of this lens when it is assembled in a frame of a pair of spectacles and used by a wearer. The rear face is finally machined in a second operation, according to the ophthalmic correction which is prescribed for the wearer.

For a progressive eyeglass, the final face of the semi-finished lens generally has a variable curvature, i.e. a mean sphere value which varies between different points of this face, so as to confer the optical power addition on the finished eyeglass. Most frequently, the rear face of the semi-finished lens is machined to a sphero-toric shape, with radii of curvature which correspond to the optical prescription.

It is also known that the optical power of a progressive ophthalmic eyeglass may continue to vary, or more specifically to increase, below the near-vision reference point. By near-vision reference point is meant a point of the eyeglass in the near vision zone where the value of the optical power corresponds to the correction which results from the ophthalmic prescription issued for the wearer, for near vision, and where a residual astigmatism of the eyeglass, or unwanted astigmatism, is minimal or zero. Within the scope of the present invention, and in a manner which is common in the field of progressive ophthalmic eyeglasses, by residual or unwanted astigmatism is meant an astigmatism quantity which results from the continuous variations of the optical power. Such a residual astigmatism is necessarily present in certain parts of the eyeglass, and one of the objects of a designer of progressive eyeglasses is to reduce the discomfort for the wearer which may result therefrom.

Moreover, it is also known, in particular from document JP 54 085 743, to adapt the distance between the reference points of the eyeglass for far vision and for near vision, according to the optical power addition value. This distance is known to a person skilled in the art as progression length. To this end, the near-vision reference point can be displaced towards the bottom of the eyeglass, while the far-vision reference point remains substantially in the same position on the eyeglass. In particular, it was observed that older wearers, for whom the optical power addition value prescribed is generally higher, often maintain a more upright, or more raised head position when they read with the chest substantially vertical. In other words, they lower the head less when reading, which leads them to read while looking through a part of the eyeglass which is situated lower down in the eyeglass with respect to a younger wearer. So it is advantageous to increase the progression length of a progressive eyeglass when the optical power addition value is higher.

In this way, the use of the progressive eyeglass does not require the wearer to alter his usual reading posture, which generally corresponds to maximum comfort or minimum fatigue.

But such a variation of the progression length of progressive eyeglasses may be insufficient to take account of the posture variations between wearers of different ages, in particular when the latter view a close object such as a book.

An object of the present invention therefore consists in providing progressive ophthalmic eyeglasses which are better adapted to the postural habits of the wearer.

To this end, the invention proposes a series of progressive ophthalmic lenses, which is indexed by the values of a set of parameters comprising the optical power addition of a spectacle eyeglass capable of being produced from each lens of the series, between the far-vision reference direction and the near-vision reference direction through this eyeglass, and for which each lens of the series determines moreover a further difference between an optical power value for the near-vision reference direction and a maximum value of the optical power of the eyeglass which is produced from this lens. Moreover, the difference between the value of the optical power for the near-vision reference direction and the maximum value which is reached for a direction of gaze pointing below the near-vision reference direction, for a position of use of the eyeglass, is comprised between $0.025 \times A^2 + 0.055 \times A + 0.01$
and $0.0775 \, A^2 - 0.06 \times A + 0.175$, where A is the optical power addition, between the reference directions for far vision and near vision through the eyeglass, expressed in dioptres and comprised between 0.25 dioptre and 5 dioptres. The values of the further difference which are given by the two formulae above are in absolute values, and are also expressed in dioptres.

Within the scope of the present patent application, by far-vision respectively near-vision reference direction is meant the direction of gaze of the wearer which passes through the far- respectively near-vision reference point of the eyeglass and the centre of the wearer's retina. To this end, standard conditions of use of an ophthalmic eyeglass by a wearer thereof are adopted, in which the distance between the eyeglass and the centre of rotation of the wearer's eye is equal to 27 mm (millimeters), and the pantoscopic angle is equal to 10° (degrees).

The far-vision reference direction for each progressive lens is the direction of vision which passes through a fitting cross marked on this lens. For example, this fitting cross is marked by means of marks or inscriptions which are carried by a final face of each lens. The fitting cross is used for adjusting the position of the ophthalmic eyeglass in a spectacle frame which is selected by the wearer. Moreover, the optical power addition value of each lens is also inscribed on the latter. The near-vision reference direction is then the first direction of vision, when moving downwards along a meridian line of the eyeglass where the residual astigmatism is minimal, for which the optical power difference with respect to the far-vision reference direction reaches the addition value.

The addition thus constitutes a first difference between optical power values obtained for different directions through the eyeglass, namely between the far-vision and near-vision reference directions. For this reason, the difference between the value of the optical power for the near-vision reference direction and the maximum value of the optical power, is called further difference. Thus, the difference between this maximum value and the value of the optical power for the far-vision reference direction is equal to the sum of the addition value and the further difference.

Thus, according to the invention, the difference between the maximum value of the optical power and the optical power value for the near-vision reference direction is fixed for each lens of the series, simultaneously with the addition value. In this way, it is possible to adjust this further difference initially as a function of the addition value of the final eyeglass, at an upstream level of the production line of the ophthalmic eyeglasses. Thus, the supply time for the eyeglass at the optician is not increased, nor is the unit price of the progressive eyeglass which is delivered to each wearer.

Moreover, given that this further difference varies in a manner concomitant with the addition, it is not necessary to increase the number of lenses of the series in order to take account of an alteration in the posture of a wearer which appears progressively when his visual accommodation ability diminishes, in particular for increasingly elderly wearers. Within the scope of the present invention, by posture of the wearer is meant the position which is preferably adopted by the latter in order to observe an object under defined conditions, for example, in order to read. This posture is characterized by a set of geometrical parameters which correspond to coordinates of points on his body, or to inclined positions which are adopted for parts of his body. Among these postural parameters, there can be mentioned the tilt of the head, the inclination of the gaze, the inclination of the chest, the height of the hands, the inclination of the document being read, etc.

A series of ophthalmic lenses according to the invention is particularly adapted for a spectacle wearer who is provided with progressive eyeglasses for the first time. In fact, in this case, the addition which is prescribed for the wearer is often low, since the latter still spontaneously adopts a posture which does not take account of the addition of his eyeglasses. The further increase of the optical power below the near-vision direction allows him to become gradually used to looking through the correct part of the eyeglass, as a function of the distance of the object observed.

Simultaneously, wearers of progressive eyeglasses which are produced from a series of lenses according to the invention benefit from an additional increase in the optical power for directions of gaze lower than the near-vision reference direction. This increased optical power provides them with improved comfort for observing very close objects, such as for example for reading at the foot of pages of a reading book which is placed on a table.

According to an improvement of the invention, the angular distance between the near-vision reference direction on the one hand, and the direction of gaze through the eyeglass for which the optical power is maximum on the other hand, may also be fixed for each lens of the series, simultaneously with the addition value of this lens. The position of the gaze through the eyeglass for which the optical power is maximum may thus also be adjusted as a function of the addition value of the eyeglass, which may take place at an upstream level of the production line of the ophthalmic eyeglasses.

Preferably, for each eyeglass which is obtained from a lens of the series, the direction of gaze corresponding to the maximum value of the optical power forms an angle with the near-vision reference direction, which is comprised between $2.5 \times A + 2$ and $5 \times A + 6$, A also denoting the optical power addition expressed in dioptres, and the angle being expressed in degrees.

The invention also proposes a method for the production of a progressive spectacle eyeglass which is intended for an identified wearer, this method comprising the following steps:

/1/ obtaining a series of progressive ophthalmic lenses as described previously;

/2/ obtaining an addition value prescribed for the wearer;

/3/ selecting a lens of the series, as a function of the prescribed addition value; and /4/ producing the spectacle eyeglass from the lens which has been selected.

Such a method thus provides the wearer with an ophthalmic eyeglass which has a further difference of optical power below the near-vision reference direction.

When a far-vision correction which is prescribed for the wearer is simultaneously obtained in step /2/, step /4/ may comprise moreover a modification of the lens in a further machining operation, which is carried out so that the eyeglass has an optical power for the far-vision reference direction, which corresponds to the prescribed far-vision correction.

In various embodiments of the invention, the addition of an eyeglass which is produced from a lens of the series, as well as the further difference between the maximum value of the optical power of this eyeglass and the value of the optical power for the near-vision reference direction, may be determined by a final shape of only one from a front face and a rear face of the lens. In this case, step /4/ of the method of the invention comprises machining the other face.

Other features and advantages of the present invention will become apparent in the following description of non-limitative embodiments, with reference to the attached drawings, in which.

The optical power of a progressive spectacle eyeglass varies continuously when a wearer of this eyeglass progressively changes his direction of gaze between the far-vision reference direction and the near-vision reference direction. To this end, the wearer views objects which are situated in front of him at increasingly short distances and in increasingly low directions. In particular, the direction of gaze which is taken as far-vision reference is the horizontal direction which corresponds to the fitting cross on the eyeglass.

Usually, the direction of the gaze which is taken as near-vision reference through a progressive eyeglass varies as a function of the addition value of the eyeglass. It passes through the eyeglass at a central point of a zone of the eyeglass in which the residual or unwanted astigmatism is minimum or zero.

Figure 1:
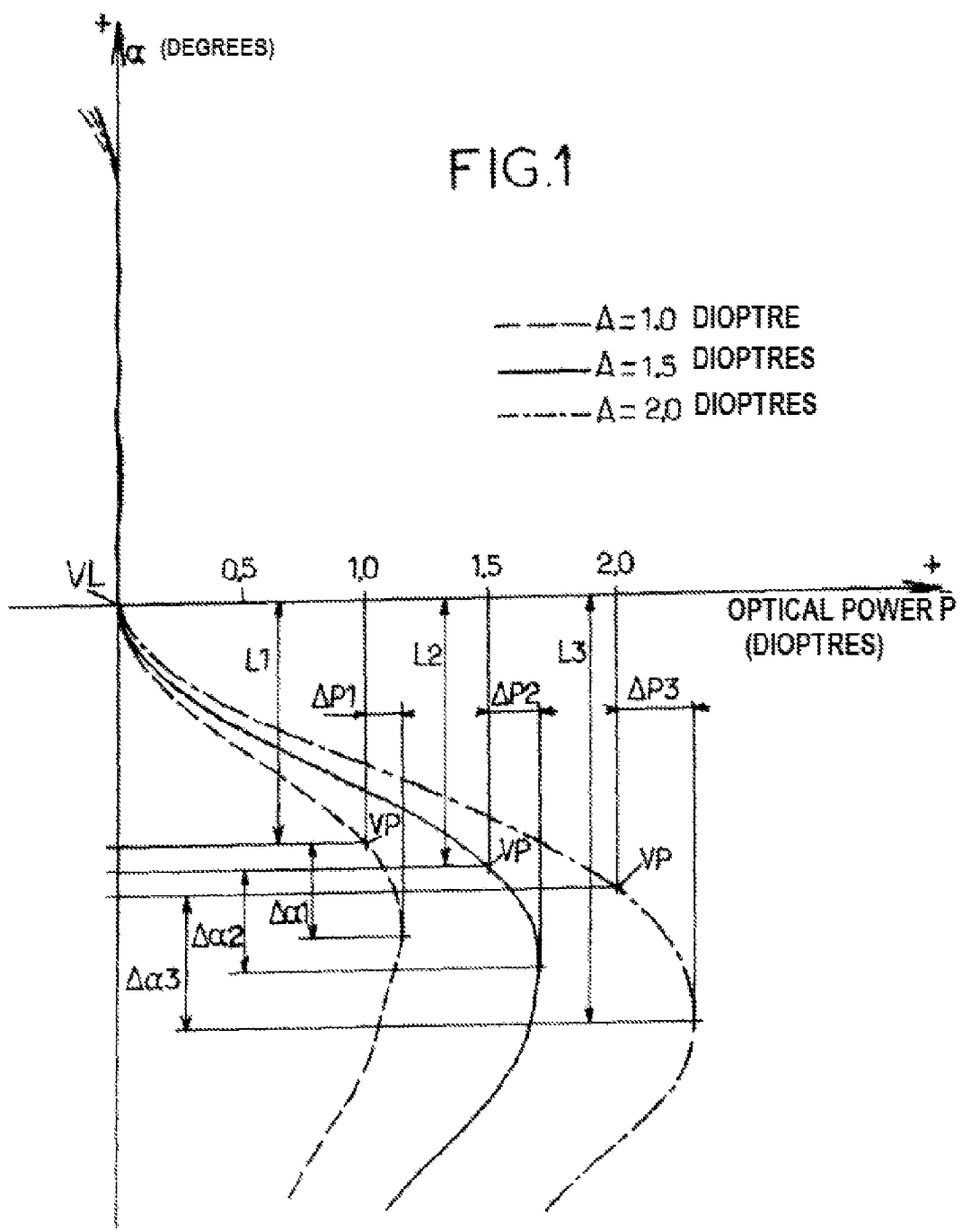
FIG. 1 is a diagram grouping together the variations in optical power of three progressive eyeglasses, along a meridian line of each of said eyeglasses.

In FIG. 1, the y-axis corresponds to the angular height a of the gaze through a progressive eyeglass, in a vertical plane by taking the horizontal direction as reference (0 degrees). The positive values of a correspond to upward directions of gaze, through the upper half of the eyeglass. The x-axis marks optical power differences P, with respect to the value for the far-vision reference direction. The curves traced correspond to three eyeglasses which have been produced according to the invention, and having addition values of 1.0 dioptre, 1.5 dioptres and 2.0 dioptres respectively. The indications FV and NV denote the far-vision and near-vision reference directions for each of these eyeglasses. $\Delta P_{\alpha 1}$, $\Delta P_{\alpha 2}$ and $\Delta P_{\alpha 3}$ denote the further optical power differences respectively for each of the eyeglasses, between the value of P for the corresponding direction NV and the maximum value of the optical power which is reached for the eyeglass in question. $\Delta\alpha_1$, $\Delta\alpha_2$ and $\Delta\alpha_3$ denote the corresponding angular differences, respectively for each of the three eyeglasses, between the near-vision NV reference direction and the direction in which the optical power is maximum. This direction of maximum optical power is situated below the near-vision NV reference direction.

As shown in FIG. 1, the values of $\Delta P_1$, $\Delta P_2$ and $\Delta P_3$ increase as a function of the addition values, in a similar way to the values of $\Delta\alpha_1$, $\Delta\alpha_2$ and $\Delta\alpha_3$. It will be noted that the angular distance which separates the far-vision reference direction and the near-vision reference direction for each eyeglass, corresponding to the progression length, increases similarly with the addition. $L_1$, $L_2$ and $L_3$ respectively denote the three eyeglasses of FIG. 1.

Figure 2:
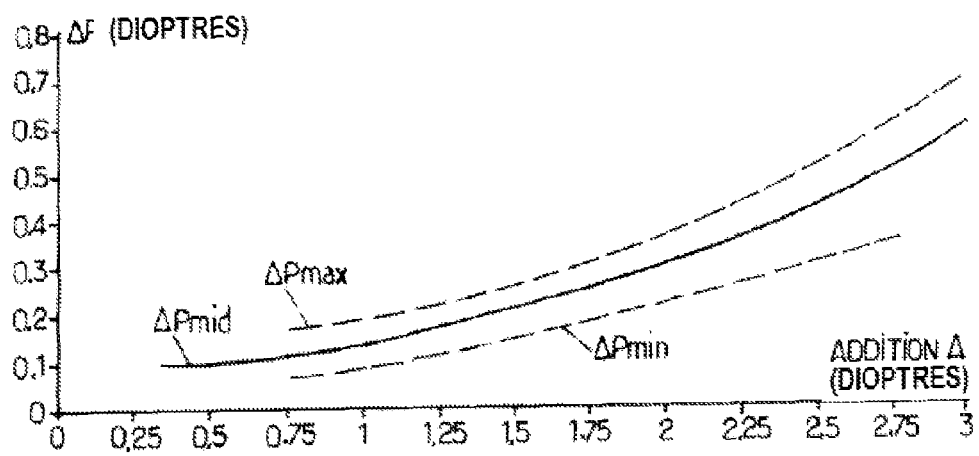
FIGS. 2 and 3 are diagrams which characterize additional variations of optical power below the near-vision reference direction, within a series of ophthalmic lenses according to the present invention.

FIG. 2 shows the variations of the difference $\Delta P$, between the maximum optical power and the optical power for the near-vision reference direction, of a series of ophthalmic eyeglasses obtained according to the invention. This difference is expressed in dioptres, and the eyeglasses of the series are marked on the x-axis by their respective addition values, also expressed in dioptres. It is understood that other parameters may vary within the series of eyeglasses, besides the addition. In particular, it is known that the reference curvature of the eyeglasses, which is indicated by the base value, may also vary.

According to the invention, the difference $\Delta P$ varies between two limits which are marked on FIG. 1 by $\Delta P_{min}$ and $\Delta P_{max}$, and for which the equations are respectively:

$$\Delta P_{min} = 0.025 \times A^2 + 0.055 \times A + 0.01 \text{ and}$$

$$\Delta P_{max} = 0.0775 A^2 - 0.06 \times A + 0.175, \text{ where A is the addition expressed in dioptres.}$$

Preferably, the eyeglasses of the series have optical power differences $\Delta P$ which are substantially equal to the following intermediate value, denoted $\Delta P_{mid}$:

$$\Delta P_{mid} = 0.06 \times A^2 - 0.02 \times A + 0.1.$$

Figure 3:
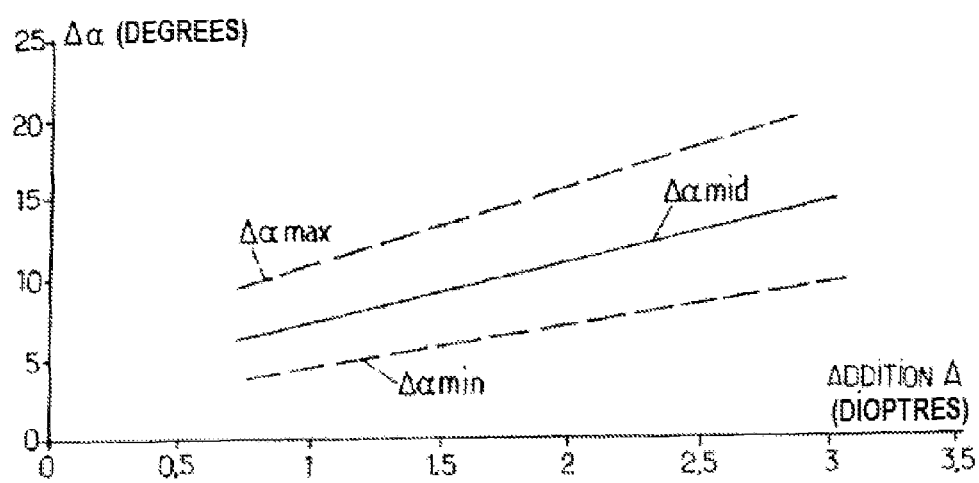

Similarly, FIG. 3 shows the variations of the angular difference $\Delta\alpha$, between the near-vision NV reference direction and the direction in which the optical power is maximum, corresponding to the optical power difference $\Delta P$ considered in FIG. 2. This difference $\Delta\alpha$ is expressed in degrees. Positive values of $\Delta\alpha$ indicate that the direction of maximum optical power points towards observed objects which are below the direction NV.

The difference $\Delta\alpha$ varies between two limits which are marked in FIG. 2 by $\Delta\alpha_{min}$ and $\Delta\alpha_{max}$, and for which the equations are respectively:

$$\Delta\alpha_{min} = 2.5 \times A + 2 \text{ and}$$

$$\Delta\alpha_{max} = 5 \times A + 6.$$

Preferably, the eyeglasses of the series have angular differences $\Delta\alpha$ which are substantially equal to the following intermediate value, denoted $\Delta P_{mid}$:

$$\Delta\alpha_{mid} = 3.75 \times A + 3.65.$$

Such values of the optical power differences $\Delta P$, comprised between $\Delta P_{min}$ and $\Delta P_{max}$, and angular differences $\Delta\alpha$, comprised between $\Delta\alpha_{min}$ and $\Delta\alpha_{max}$, for each value of the addition A provide a good visual comfort and bodily posture to a large number of wearers of progressive eyeglasses. Indeed, they correspond to variations of postural parameters which are shown in the diagrams of FIGS. 4a to 4d, as a function of the addition A. These parameters have been measured on wearers of progressive eyeglasses, and correlated with the addition values prescribed for the latter. In a known manner, the addition values A which are higher, correspond in general to older wearers, since the accommodation ability of the eye decreases with age.

In other words, producing a progressive eyeglass according to the invention may comprise a prior step of designing the lenses of the series, which is carried out from a sample of several wearers. During this prior step, the further difference $\Delta P$ is determined for at least one eyeglass which is obtained from each lens of the series, from postural values which are measured for wearers of the sample, provided with progressive spectacle eyeglasses having the lens addition.

Moreover, during this prior step and for each lens of the series, the angle $\Delta\alpha$ may also be determined from the postural values which have been measured for the wearers of spectacle eyeglasses.

Figure 4A:
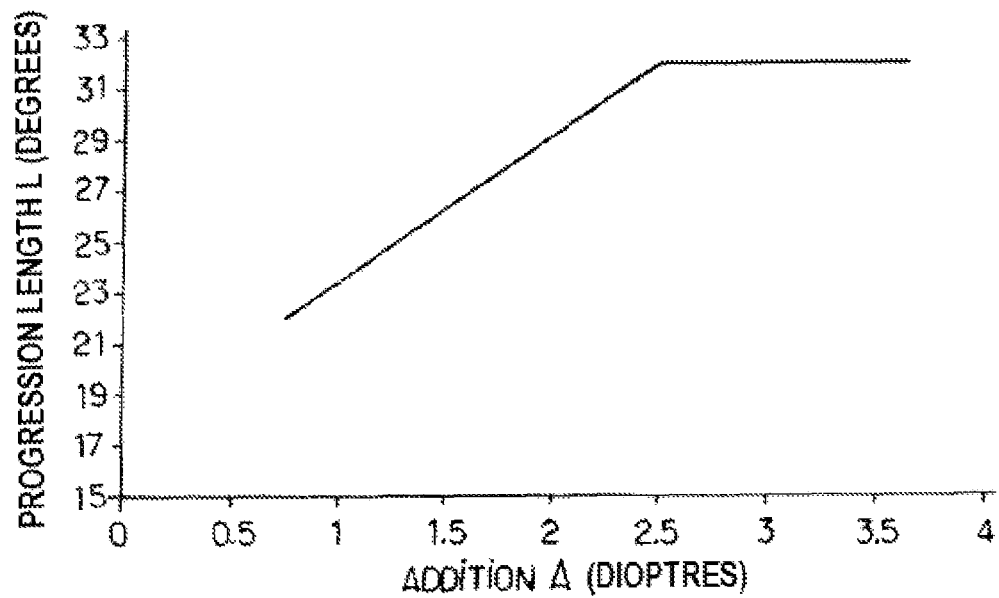
FIGS. 4a-4d are diagrams of the variation of four postural parameters, for wearers provided with progressive eyeglasses having variable additions.
Figure 4B:
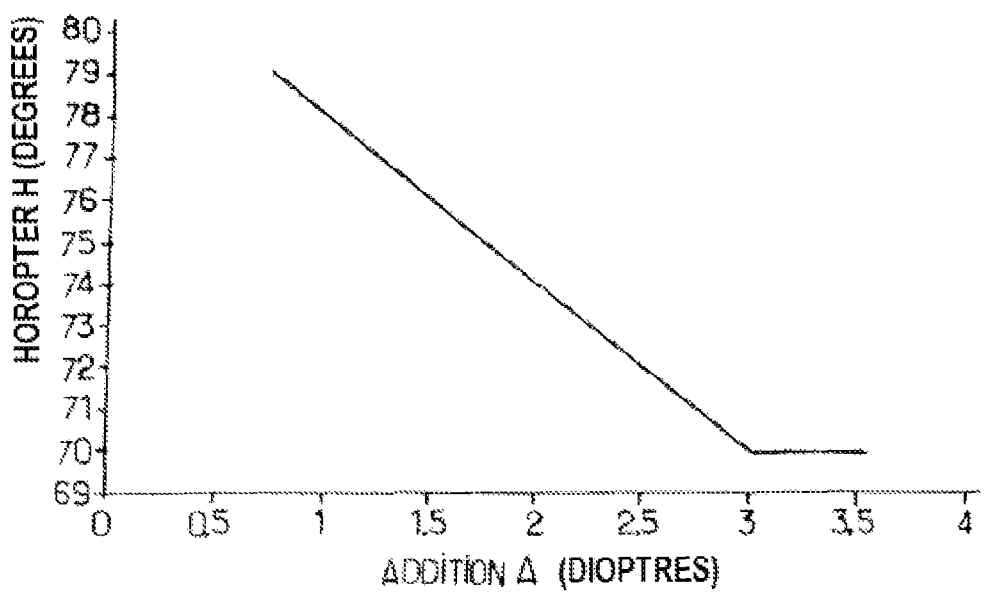
Figure 4C:
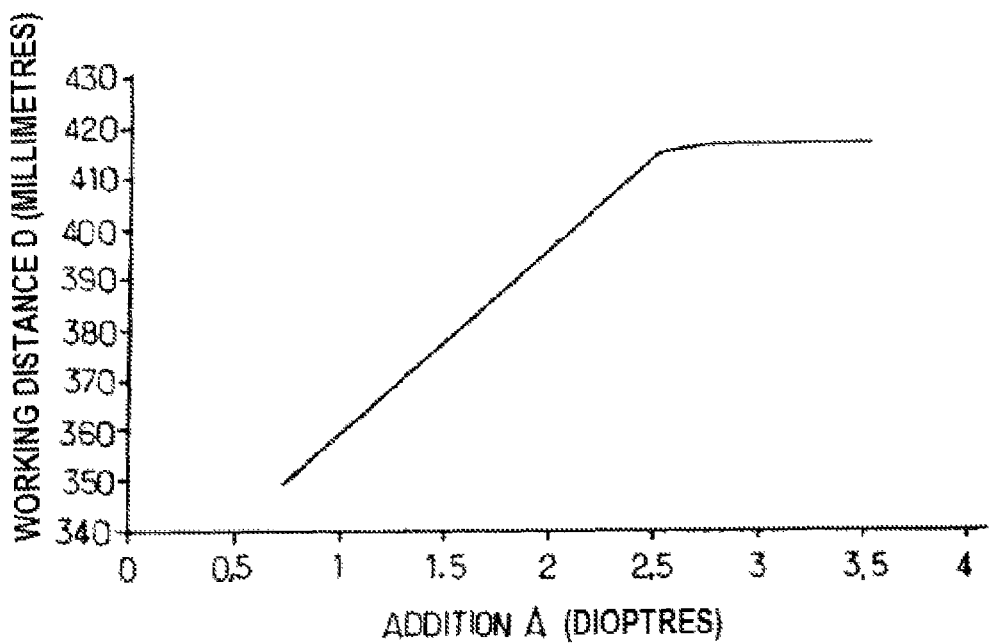
Figure 4D:
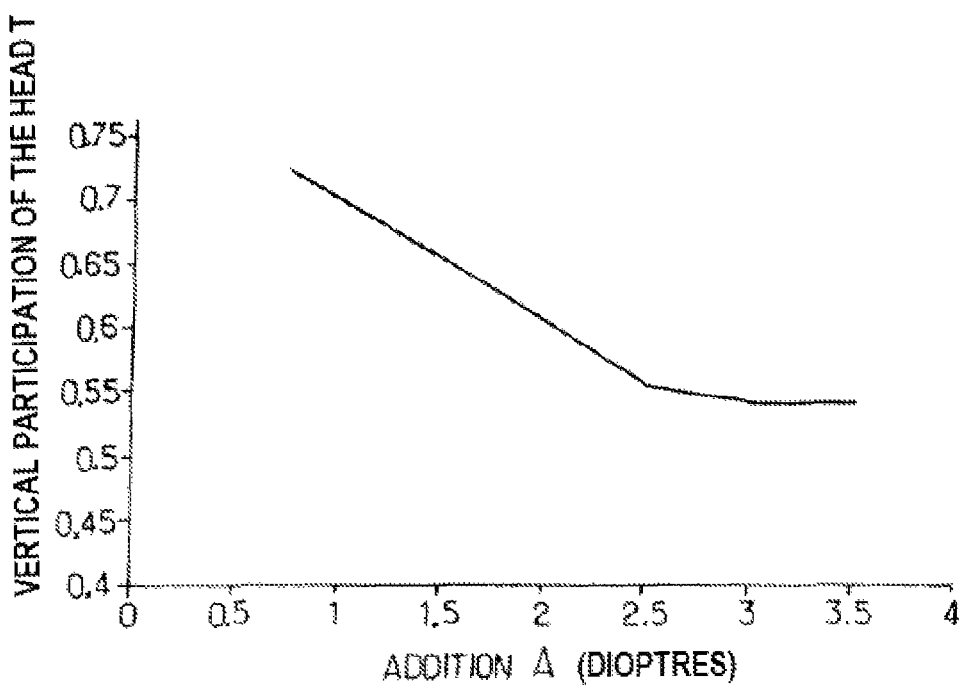

The postural values which are noted during the prior step may correspond to the parameters which are reported in FIGS. 4a to 4d. These are: the progression length L expressed as an angular difference between the reference directions for far and near visions (FIG. 4a), the horopter H expressed in degrees and corresponding to the angle between the direction of gaze and the plane of a reading page held by the wearer of the eyeglass (FIG. 4b), the working distance D expressed in millimeters and corresponding to the distance between the wearer's eye and the object examined in near vision (FIG. 4c), as well as the vertical participation T of the head of the wearer (FIG. 4d). The vertical participation of the head characterizes the contribution of a movement of the wearer's head to a change of his direction of gaze. It is equal to the ratio of the angle of rotation of the head in a vertical plane to the angular variation of the direction of the gaze in the same plane. Thus, the progression length L increases in a substantially linear manner from 22° to 32° whilst the addition A varies between 0.75 dioptre and 2.50 dioptres, the horopter H decreases in a substantially linear manner from 79° to 70° whilst the addition A varies between 0.75 dioptres and 3.00 dioptres, the working distance D increases in a substantially linear manner from 350 mm to 415 mm whilst the addition A varies between 0.75 dioptre and 2.50 dioptres, and the participation of the head T decreases in a substantially linear manner from 0.725 to 0.55 whilst the addition A varies between 0.75 dioptre and 2.75 dioptres.

The lenses of a series according to the invention may each be a semi-finished ophthalmic eyeglass. Such a semi-finished eyeglass has a final face, for example its front face, and is intended to be machined in a second operation on the other face as a function of the ophthalmic prescription which was issued for the wearer. It can be produced in large series in centralized factories, while the machining on demand of the rear face can be carried out close to the place of sale in order to reduce the supply time. In this case, the front face has a complex shape, with a variable curvature, which confers the addition value on the finished eyeglass.

For such a series of semi-finished eyeglasses according to the invention, the front face of each of these determines, as well as the addition value, the value of the further difference of optical power ΔP as well as, optionally, the angular difference Δα. These values result from in variations of curvature of the front face of each semi-finished eyeglass. Initially, during the design of the semi-finished eyeglasses of the series, each of these may be defined by a set of target values of optical or surface parameters, which may include A, ΔP and optionally Δα. Each eyeglass is then digitally optimized, in a manner which is known to a person skilled in the art.

When a wearer needs to be provided with a progressive eyeglass, a semi-finished eyeglass is selected in the series, which has an addition value corresponding to the prescription previously established for the wearer. This semi-finished eyeglass is then machined on its rear face, so as to give the latter a shape which in combination with the front face produces an optical power according to the far-vision prescription of the wearer.

A person skilled in the art thus understands, in the light of the description of the invention which has been given above, that the invention is particularly advantageous when the series of lenses according to the invention is made available to an ophthalmic laboratory. Such an availability of the series makes it possible to rapidly deliver a finished progressive eyeglass to a client, which is both in accordance with his prescription and adapted to his viewing postures, whatever the addition value which is prescribed for him.

The invention claimed is:

1. Series of progressive ophthalmic lenses, indexed by values of a set of parameters comprising an optical power addition of a spectacle eyeglass which can be produced from each lens of the series, between a far-vision reference direction and a near-vision reference direction through said eyeglass,
   the far-vision reference direction being a direction of vision passing through a fitting cross marked on each lens,
   the optical power addition value of each lens being inscribed on said lens,
   each lens moreover determining a further difference between an optical power value for the near-vision reference direction and a maximum value of the optical power of an eyeglass which is produced from said lens, said maximum value of the optical power being reached for a direction of gaze pointing below the near-vision reference direction for a use position of the eyeglass,
   the series of lenses being characterized in that said further difference, in absolute value and expressed in dioptres, is comprised
   between $0.025 \times A^2 + 0.055 \times A + 0.01$
   and $0.0775\, A^2 - 0.06 \times A + 0.175$,
   where A is the optical power addition expressed in dioptres, comprised between 0.25 dioptre and 5 dioptres.

2. Series according to claim 1, in which, for each eyeglass obtained from a lens of the series, the absolute further difference between the maximum value of the optical power and the value of the optical power for the near-vision reference direction, is substantially equal to $0.06 \times A^2 - 0.02 \times A + 0.1$.

3. Series according to claim 1, in which the addition of an eyeglass obtained from a lens of the series, and also the further difference between the maximum value of the optical power of said eyeglass and the value of the optical power for the near-vision reference direction through said eyeglass, are determined by a final shape of a front face and/or of a rear face of the lens, with respect to the use position of the eyeglass.

4. Series according to any claim 1, in which, for each eyeglass obtained from a lens of the series, the direction of gaze corresponding to the maximum value of the optical power forms an angle Δα with the near-vision reference direction, said angle Δα being comprised
   between $2.5 \times A + 2$
   and $5 \times A + 6$,
   A being the optical power addition expressed in dioptres, and the angle Δα being expressed in degrees.

5. Series according to claim 4, in which, for each eyeglass obtained from a lens of the series, the angle Δα between the direction of gaze corresponding to the maximum value of the optical power and the near-vision reference direction, is substantially equal to $3.75 \times A + 3.65$, A being the optical power addition expressed in dioptres.

6. Method for producing a progressive spectacle eyeglass intended for an identified wearer, comprising the following steps:
   /1/ obtaining a series of progressive ophthalmic lenses according to claim 1;
   /2/ obtaining an addition value prescribed for said wearer;
   /3/ selecting a lens of the series, as a function of the prescribed addition value; and
   /4/ producing the spectacle eyeglass from the selected lens.

7. Method according to claim 6, according to which a far-vision correction prescribed for the wearer is moreover obtained in step /2/, and according to which step /4/ comprises a modification of the lens in a further machining operation, so that the eyeglass has an optical power for the far-vision reference direction through said eyeglass, which corresponds to the prescribed far-vision correction.

8. Method according to claim 7, according to which the addition of an eyeglass obtained from a lens of the series, and also the further difference between the maximum value of the optical power of said eyeglass and the value of the optical power for the near-vision reference direction through said eyeglass, are determined by a final shape of only one face from a front face and a rear face of the lens, and according which the step /4/ comprises a machining of the other of the said faces.

9. Method according to claim 6, comprising moreover a prior step according to which, for each lens of the series, the further difference between the maximum value of the optical power and the value of the optical power for the near-vision reference direction, for an eyeglass produced from said lens, is determined from postural values measured for wearers of progressive spectacle eyeglasses having the addition of said lens.

10. Method according to claim 9, according to which, during the prior step and for each lens of the series, an angle between the direction of gaze corresponding to the maximum value of optical power for an eyeglass produced from said lens on the one hand, and the near-vision reference direction through said eyeglass on the other hand, is determined moreover from the postural values measured for wearers of progressive spectacle eyeglasses having the addition of said lens.

11. Method according to claim 9, according to which the postural values comprise horopter values, values of a distance between an eye of the wearer and an object examined in near vision, and/or a vertical participation of the head of the wearer in a change of direction of gaze.

* * * * *